Figure 1:
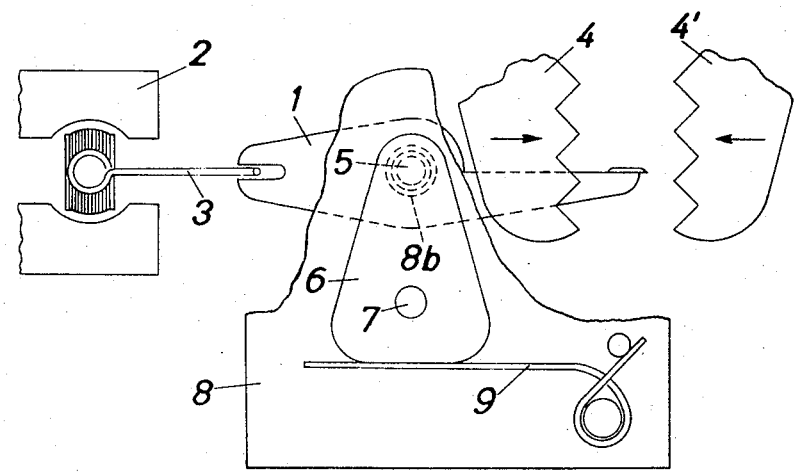

July 14, 1959   M. BURGER ET AL   2,894,439
TRACTIVE INDICATOR FOR AUTOMATIC APERTURE CONTROLLERS
Filed March 1, 1954   3 Sheets-Sheet 1

INVENTORS:
MICHAEL BURGER
ERICH BURGER
BY *Connolly & Hutz*
THEIR ATTORNEYS

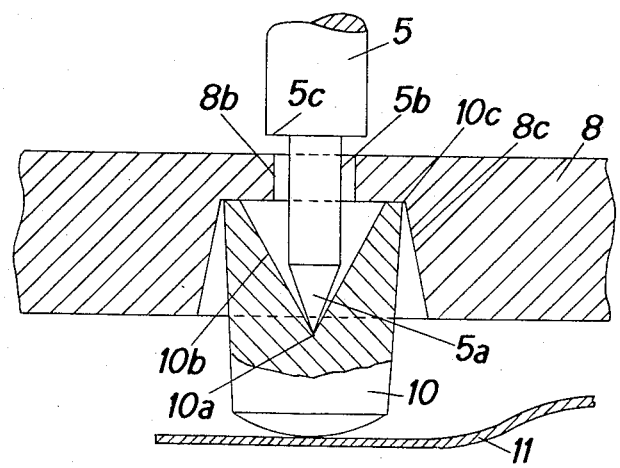
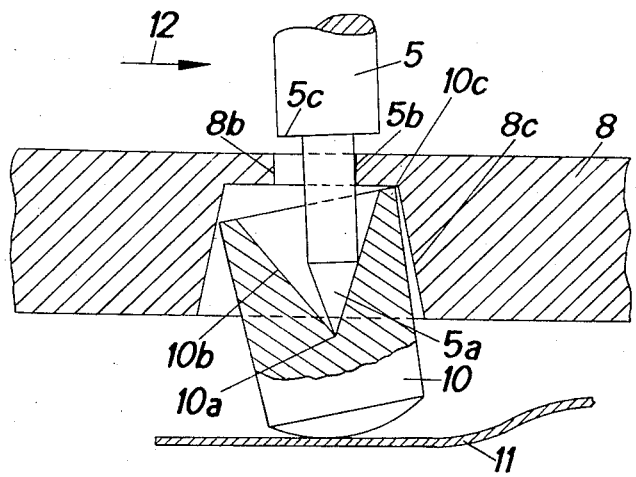

INVENTORS:
MICHAEL BURGER
ERICH BURGER
BY *Connolly & Hutz*
THEIR ATTORNEYS

United States Patent Office 2,894,439
Patented July 14, 1959

2,894,439

TRACTIVE INDICATOR FOR AUTOMATIC APERTURE CONTROLLERS

Michael Burger and Erich Burger, Munich, Germany

Application March 1, 1954, Serial No. 413,324

Claims priority, application Germany March 12, 1953

9 Claims. (Cl. 95—64)

This invention relates to automatic exposure regulators for photographic apparatus and more particularly to a tractive indicator mechanism connecting a light-sensitive device with a scanning device of an aperture control mechanism. Specifically, the invention relates to a novel tractive indicator including a novel bearing support structure for mounting a transmission linkage connecting the moving element of a galvanometer with an intermittently moving scanning device for controlling the scanning device to give the desired degree of aperture opening in a photographic apparatus. The present invention will be more readily understood by reference to German Patent 842,887, issued July 8, 1949 and the corresponding U.S. Letters Patent No. 2,838,985 issued June 17, 1958, disclosing an improved automatic exposure regulator having a scanning device of the type herein contemplated.

A number of systems for automatically setting the aperture of photographic apparatus have long been known in the art. Attempts to improve these various systems have failed to materialize a practical embodiment which would be reliable in operation without limiting the required flexibility of the galvanometer. These attempts have involved a search for a connecting transmission linkage arrangement having a member which can be readily and easily controlled by the galvanometer, but which would be of strong and durable construction, and yet simple and inexpensive to manufacture. As a particular requisite, it is necessary that this member be relatively light-weight and yet structurally strong to withstand high strains and stresses imposed upon it by the scanning device. At the same time, the bearings of the transmission linkage forming the tractive indicator must be so constructed as to readily avoid or deflect relatively light pressures in certain directions. The finiteness with which such structural limitations must be included in a given system will naturally depend in turn upon the type of photographic apparatus in which the system is employed.

It already has been suggested for systems which develop a radial scanning or touching pressure to employ an intermediate linkage between the galvanometer and the scanning device of an aperture control mechanism whereby it is possible to arrange the bearing structure of the intermediate linkage as being more rugged and durable, than would be possible for that of the galvanometer pointer. Such prior developments have provided relatively unsatisfactory service due to the fact that the roughness of the intermediate bearing detracts from the desired degree of responsiveness in the operation of the system. Such inefficacy persists even if provision is made for a reduction in speed and movement of the intermediate linkage while permitting the galvanometer pointer to move at its customary high rate of speed.

Accordingly, it is the prime object of the present invention to provide an improved tractive indicator structure as an intermediate linkage between the galvanometer and the scanning device of an automatic aperture control mechanism which will have a fine point bearing capable of supporting the tractive indicator for the desired degree of finite adjustment. A further object of the present invention is to provide a tractive indicator having a supporting structure which includes both a fine point bearing and a rough point bearing arrangement whereby predetermined stresses on the indicator may be taken by the rough bearing without damaging the fine point bearing. Other and distinct objects will become apparent from the description and claims which follow.

In accordance with the present invention, the tractive indicator is constructed to have a delicate pivotal support employing a fine point jewel-type bearing, which bearing is in turn pivotally or resiliently mounted so as to be capable of evading predetermined directional pressures or stresses imposed by the operation of the scanning tongs or arms of the automatic aperture control mechanism. In a preferred embodiment of the invention, the tractive indicator comprises a swingable lever having a pivotal mounting on a bearing spindle including structure providing both a rough and a fine bearing surface. With such arrangement, the rough bearing is adapted to take up the pressure without straining the fine bearing and may advantageously take the form of a shoulder on the bearing spindle; or alternatively, comprise a portion of the tapering surface of the spindle adjacent the fine point bearing.

In order to permit the fine point bearing to evade undesirable pressures in certain directions, it can be supported in conjunction with a restoring force so as to permit deflection of the fine bearing point during instances of stress. Such arrangements, according to the present invention, may include a bearing support which takes the form of a resilient swivel carriage or movable bodies which can axially translate or tilt against the force of support springs. Alternatively, the same result may be obtained by providing bearing plates imbedded in cushions of elastic material.

In arrangements employing the tiltable or translatable support body, the body is formed with a tapered recess for receiving and seating the fine point of the bearing spindle, and if the degree of taper is kept very small, i.e. the recess is almost level, an elastic bearing can take place by simple translation of the body in an axial direction.

It will be obvious that various different combinations can be derived for evading and/or converting directional pressures on the bearing element depending upon the desired degree of flexibility and upon the adjustment between the resilient bearing support and the location and form of the rough bearing member. The tractive indicator of the present invention can be used for substantially all known type automatic aperture control systems and represents a considerable improvement over prior contemporary structures of like type. It will be appreciated that the present tractive indicator arrangement can be employed with aperture control systems having pressure balancing means, as for example, those which employ scissors-like tong elements as a scanning mechanism, without need for a rough bearing point, since the indicator need only compensate for or take-up pressures to a limited degree until the pressure balance becomes effective.

Figure 2:
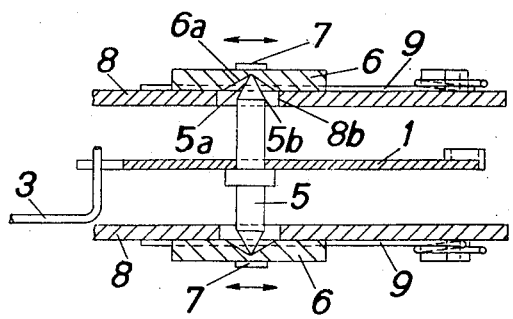
Figure 5:
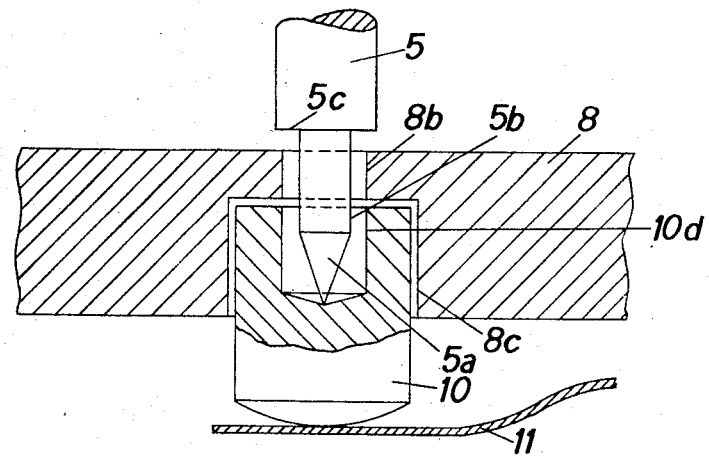
Figure 6:
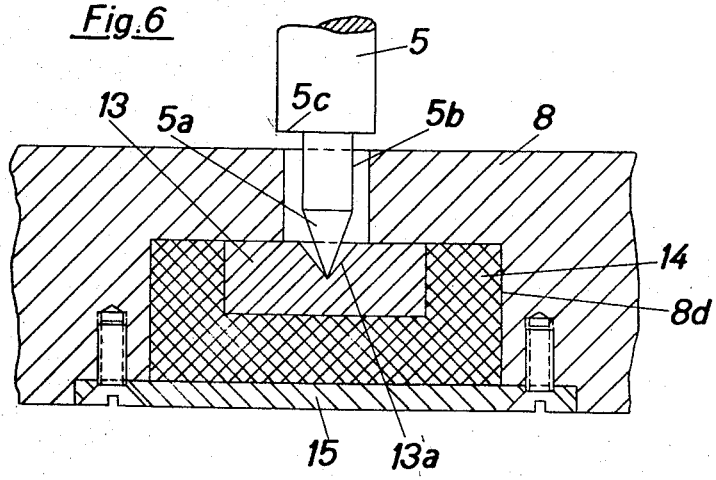

Having broadly described the invention, reference will now be made to the accompanying drawings in setting forth specific examples thereof, and in which:

Fig. 1 is a schematic view of a tractive indicator constructed according to the present invention, Fig 2 is a sectional view, partly in elevation, of the indicator of Fig. 1, Fig. 3 is a sectional view, partly in elevation, showing a modified form of bearing support for the tractive indicator according to the present invention, Fig. 4 is a sectional view, partly in elevation, of the bearing support of Fig. 3 illustrating the tilting operation of the rough bearing adjustment, Fig. 5 shows a modified form of bearing support according to the invention, and Fig. 6 shows a still further modified form of bearing support employing an elastic cushion.

In the form of the invention shown in Figs. 1 and 2, the tractive indicator comprises a lever 1 mounted on a spindle member 5. One arm of the lever includes a slotted connection cooperating with the pointer 3 of a galvanometer mechanism 2. The opposite arm of the lever projects between a pair of opposed serrated arms 4, 4' forming part of a known scanning device. According to the present invention, the pivot spindle 5 is fixedly connected to lever 1 and includes bearing or journal areas terminating in opposed fine point bearings 5a at the respective ends of the spindle. The tapered shoulders or sloping walls formed adjacent the tip points of the spindle are adapted to function as bearing surfaces and project through perforations 8b in plane plates 8 at each side of the lever.

In order to protect the fine bearing points 5a and to provide the desired degree of flexibility in the operation of the tractive indicator, the projecting ends of shaft 5 are inserted in opposed swivel carriages 6 comprising a pair of pivoted plates mounted for rotation about pivot pins 7 carried on the respective plane plates 8. A light spring 9 engages the underside of each swivel carriage in the manner illustrated in Fig. 1 and serves to normally position the carriage in an upright, vertical direction so as to align a complementary tapered recess 6a in each carriage with the fine points 5a on the respective ends of spindle 5. The arrangement is such that spindle 5 and lever 1 are suspended between the swivel carriages 6 so that both the lever and spindle can translate radially of the axis of spindle 5 to a limited extent by reason of the turning of carriages 6 about pivots 7 against the effect of springs 9 under the action of radially directed pressures, as for example, as exemplified by the arrows in Fig. 2. The tapered portion 5b of the spindle 5 is positioned within the bore hole 8b in plane plate 8 and under strong radial deflection force will move laterally into contact with the periphery of the bore hole to form a strong, rough, pivot bearing at that point. It will be obvious that this action fully protects the fine bearing point 5a against damage. In systems where the scanning members 4, 4' comprises a part of a tong-like scanning device, as for example, similar to that set forth in our said prior copending application or in apparatus employing means for locking and holding the movable member of the galvanometer, the bore holes 8b are made only so large as to insure the contacting of lever 1 by the respective tong members prior to movement of the spindle portion 5b into contact with the periphery of the bore hole. It will be obvious that the present arrangement affords the highest degree of flexibility in the scanning mechanism in conjunction with provision for total immobility of the setting device by reason of a simplified structural arrangement which neither increases the moved mass of the tractive indicator nor increases the expense of production.

A modified form of the invention is illustrated in Figs. 3 and 4 in which the evasion and conversion of pressures directed against the fine point bearing can be realized in either direction, i.e., in an axial or radial direction. As shown in Fig. 3, this form of the invention comprises a pivotal shaft or spindle mount 5 for connection with the tractive indicator 1 in a manner identical to that set forth in respect to the previous embodiment, but in which the spindle is suspended in loose or freely rotatable cup members or prismatic bodies 10 (only one of which is shown in the figure) positioned in an opening 8c in the outer sidewall of the plane plates. The arrangement is such that the cup-like body normally occupies a position in a bore 8c in the plane plate 8 as shown in Fig. 3, and in which position spring 11 maintains the leading peripheral face 10c thereof in direct contact with the inner wall of the plane plate bore 8c. This arrangement permits spindle 5 to rotate on the fine point bearings 5a received within a tapered or conical cavity 10b in each support body 10.

Upon the occurrence of a radially directed pressure, as for example, in the direction of arrow 12 (see Fig. 4), the pressure exerted on spindle 5 is initially transmitted via point 5a at the apex 10a of cavity 10b to tilt the body 10 against the force of light spring 11, the immobilized peripheral edge 10c of the body operating as a fulcrum point as shown in Fig. 4. By reason of this translating action, a shank portion 5b of spindle 5 moves into close contact with the sidewall of bore hole 8b to provide a durable, rough bearing surface. At the same instant, the tapered portion of point 5a moves into substantial contact with the sidewall of the conical cavity 10b in the body 10 in the manner illustrated in Fig. 4 to provide a supplemental resisting force protecting the fine point 5a against damage.

According to the effect desired, the relative spacial positioning of the bearing sidewalls 8b, 10b, can be so controlled as to contact the shaft 5 at either 5a or 5b in any sequence instead of simultaneously. This can be readily accomplished by enlarging opening 8b or cavity 10b. In any case, however, the sidewalls of the cup receiving cavity 8c in the plane plate have to be strongly inclined so as to allow sufficient tilting of body 10 to bring surfaces 5b and 8b, respectively, 5a and 10b into contact.

Provision for evading and compensating axially directed forces is made by forming a shoulder 5c on spindle 5 whereby axial movement of shaft 5, contrary to the effect of spring 11, serves to register shoulder 5c against the plane plate 8 while at the same time the tapered end portion adjacent the fine point bearing 5a moves into contact with the sloping wall surface of the conical cavity 10b. It will be understood that movement of the tapered shoulder of point 5a into frictional surface engagement with the wall 10b by reason of a tilting of cup 10 about the fulcrum point 10c serves to impede further axial translation of the spindle and at the same time to relieve concentration of the axially directed force at the tip of the point, further axial deflection serving to move cup member 10 against spring 11 by reason of the contacting engagement between sidewall 10b and the sloping shoulder of the point.

If desired, provision can be made for obtaining flexibility along the axis of spindle 5 and in only one radial direction. This facet of the invention is readily accomplished by forming the cup member 10 as a square body while contouring the recessed seating area 8c to have inclined wall surfaces defining a trapeze-like configuration. Alternatively, in cases where it is desirable to retain flexibility in only the axial direction while maintaining the tractive indicator immobile in a radial direction, the recessed seating area 8c is formed as a cylindrical bore having a diameter substantially equal to the external diameter of cup member 10 which is also formed of a cylindrical contour.

Still further modified form of the invention employing the recessed seating area 8c and the cup member 10 in cylindrical forms can be utilized to provide a bearing arrangement for the spindle shaft 5 which is flexible in all directions. This form of the invention is illustrated in Fig. 5 of the drawings. This form of the invention is illustrated in Fig. 5 of the drawings in which the plane plate 8 is counterbored as at 8b and 8c to provide the recessed seating area 8c and in which is positioned the cup member 10, the latter being maintained in the cavity 8c under the effect of a spring 11. The bearing point seating cavity in the cup member in the present example is formed as a cylindrical recess 10d terminating in a shallow end wall of slight conical taper.

In the present modification the bearing point receiving bore 10d is formed to have the same diameter as the passageway 8b whereby the shank portion 5b of spindle 5 will engage either peripheral wall surfaces under radial deflection forces, or in some instances, will engage both wall surfaces simultaneously. The resilient mounting of cup member 10 substantially reduces the friction concentrated at the bearing point 5a by facilitating disengagement of bearing point 5a from the nip of the conical end wall as shank 5b moves laterally into engagement with sidewall 10d of the cover or sidewall 8b of the plane plate.

Yet another modification of the invention is illustrated in Fig. 6 of the drawings and in which the spring member has been replaced by an elastic cushion. As shown in the figure, the bearing point 5a on the spindle is received within a plate or cup member 13 having a recessed conical bearing seat 13a. The cup member 13 is imbedded in a relatively large cushion 14 of elastic material, preferably rubber, enclosed in a cylindrical chamber 8d in the plane plate and retained therein by means of a removable cover plate 15. Due to the elastic capacity of cushion 14, the bearing member 13 can move in either axial or radial directions in response to translation of shaft 5, thus permitting evasion of stresses at the tip point 5a.

As will be readily understood from previous descriptions, radially directed forces will serve to move shaft 5b into contact with the peripheral wall of bore 8b to provide a rough and strong pivotal bearing which in turn considerably reduces the pressure between point 5a and cavity 13a. Axially or radially directed forces can serve to pivot plate 13 in the manner previously described with respect to the embodiment of Figs. 3 and 4 to bring about a contact between the sloping wall surfaces 13a and 5a to in turn preserve the delicate fine point on the spindle. Stronger axial force can be compensated for by permitting shoulder 5c on the spindle to contact the plate 8.

In order to prevent inadvertent displacement of the bearing assembly, it is preferred to maintain the distance between shoulder 5c and plane plate 8 when the tractive indicator is in an unstressed condition to be less than the depth of the conical seating cavity 13a. It will be readily understood that this relatively freely suspended bearing arrangement provides substantial advantages, including an enhanced working life, over the pressure stressed type bearing arrangements of the prior art.

It should be particularly noted that the swivel plate arrangement of Figs. 1 and 2 and the elastic cushion arrangement of Fig. 6 provide a bearing support for the tractive indicator which is equally efficient in either vertically or horizontally directed operating positions. It should also be noted that the present invention comprises a means for suspending jewel-type point bearings in a resilient manner so as to obtain a most effective journal in tractive indicators of automatic aperture control apparatus. It will be appreciated that the invention can be practiced by providing a combination of a point bearing with a pivot or shoulder bearing of other known types or in instances where the device is adapted for use with an automatic aperture having pressure balance, by a resilient support of a fine bearing alone. It further will be understood that the invention is not restricted to the specific bearing structure described or illustrated, and may be practiced by combining other type fine bearings with other type rough bearings.

As many apparently widely different embodiments of this invention may be made without departing from the spirit and scope hereof, it is to be understood that the invention is not limited to the specific embodiments hereof, except as defined in the appended claims.

What is claimed is:

1. A transmission linkage for connecting a scanning device with a galvanometer pointer which is intermittently engaged by said scanning device in a photographic apparatus including an automatic exposure regulating device which incorporates said galvanometer and said scanning device, said linkage comprising scanning device, a galvanometer pointer, a lever, a spindle rotatably supporting said lever, a stationary support member, shock-absorbing bearing means rotatably mounting said spindle upon said stationary support member, said shock-absorbing bearing means including a fine bearing surface for precisely positioning said spindle prior to scanning of said lever by said scanning device and a rough bearing surface for restraining displacement of said spindle beyond a predetermined limit when a shock is applied to said lever by said scanning device, said shock-absorbing bearing means including a resilient means for normally maintaining said spindle engaged by means of said fine bearing surface, said lever being disposed between said galvanometer pointer and said scanning device, one end of said lever being disposed in the path of movement of said scanning device in position to be intermittently scanned and released by said scanning device, pin and elongated slot means operatively engaging said galvanometer pointer with the other end of said lever, the elongated walls of said slot being substantially perpendicularly disposed relative to the path of movement of the end of said pointer and disposed substantially in line with the direction of engaging movement of said scanning device to respectively permit said lever to be precisely positioned by said galvanometer pointer and to move freely relative to said galvanometer pointer when said lever and said spindle are displaced, and said rough bearing surface arresting said displacement of said spindle and lever before said pin can contact the end of said slot thereby preventing damage to said pointer.

2. A transmission linkage as set forth in claim 1 wherein said spindle includes a cylindrical shaft, said stationary support member includes an aperture of a diameter larger than the diameter of said spindle, said shaft extending through said aperture, and said shaft and said aperture providing said rough bearing surface.

3. A transmission linkage as set forth in claim 2 wherein said spindle includes a fine conical point and said shock-absorbing bearing means includes a conical recess whose apex angle is larger than the apex angle of said fine conical point, and said fine conical point engaging within the apex of said recess to provide said fine bearing surface.

4. A transmission linkage as set forth in claim 3 wherein said conical recess is provided within a carriage which is rotatably mounted upon said stationary member, and a spring means resiliently reacts between said carriage and said stationary support member to maintain said shaft centrally positioned within said aperture.

5. A transmission linkage as set forth in claim 3 wherein said shock-absorbing bearing means is comprised of a jewel-type pivot bearing.

6. A transmission linkage as set forth in claim 5 wherein said shock-absorbing means is comprised of a cup member inserted within a recess in the wall of said stationary support member, the adjacent side walls of said stationary support member of said cup member diverging to permit said cup member to tilt when said spindle is displaced, and said displacement being terminated when said walls of said fine conical point of said spindle and said wall of said conical recess engage each other.

7. A transmission linkage as set forth in claim 6 wherein a resilient means reacts between said cup member and said stationary support member in a direction to maintain said fine bearing point engaged within the apex of said conical recess.

8. A transmission linkage as set forth in claim 3 wherein the walls of said cup member and said recess are cylindrical and substantially in line with the axis of said spindle to permit said cup member to be displaced by said fine conical point in a direction parallel to the axis of said spindle to permit said displacement of said spindle.

9. A transmission linkage as set forth in claim 3 wherein said conically recessed element is coupled to said stationary support member by means of an elastic material which deforms to allow said spindle to be displaced.

References Cited in the file of this patent

UNITED STATES PATENTS

| | | |
|---|---|---|
| 2,006,606 | Roman | July 2, 1935 |
| 2,543,328 | Morf | Feb. 27, 1951 |
| 2,587,677 | Ammelung | Mar. 4, 1952 |
| 2,596,449 | Van Haaften | May 13, 1952 |

FOREIGN PATENTS

| | | |
|---|---|---|
| 842,887 | Germany | Nov. 20, 1952 |